Patented Jan. 12, 1926.

1,569,221

UNITED STATES PATENT OFFICE.

STANLEY E. FAITHFULL, OF BOSTON, MASSACHUSETTS.

MANUFACTURE OF LACTIC ACID.

No Drawing. Application filed May 8, 1924. Serial No. 711,894.

*To all whom it may concern:*

Be it known that I, STANLEY E. FAITHFULL, a citizen of the United States, residing at Boston, Massachusetts, have invented certain new and useful Improvements in the Manufacture of Lactic Acid, of which the following is a specification.

The present invention relates to the production of lactic acid and lactates, and the object of the invention is to produce these bodies free from butyric acid, butyrates and other foreign substances. In accordance with the prior processes heretofore commonly employed, lactates have been formed in solution, by fermentation and neutralization, the lactates then crystallized out (carrying always more or less impurities) and then these lactates purified by recrystallization and the like. On the contrary, I form the lactate solution, then I remove the impurities from said solution, leaving the lactate in a pure state in the solution, from which any desired end product can be formed.

A highly important feature in the present process is the step of injecting oxygen (e. g. in the form of air) into the liquor, from the beginning of the fermentation and continuing this as long as any lactate is in the solution.

Further novel steps and advantages will be apparent from the reading of the specification.

In the present process, I subject hydrolyzed carbohydrate (e. g. glucose molasses, mannose or the like) which should of course contain small amounts of proteid material or conversion products thereof, together (if desired) with some small amounts of potassium and other metal salts, etc., all as well known nutrient material for bacteria, is subjected to a fermentation with lactic bacteria, in slightly acid solution.

While in the prior art, the general idea seems to have been held that the presence of air is inimical to the lactic bacteria, I have definitely shown that not only is this not correct, but the presence of air, throughout the process while preventing the growth and multiplication of the organism which produces butyric acid, greatly activates the lactic acid bacteria and hence accelerates the production of lactic acid and lactates.

In order to further explain the nature of my invention the following specific example is given, of procedure within the invention, this being given in a purely illustrative and not restrictive sense.

The exact procedure of the example has been found by me to be practical, but it is to be understood that variations can be made, within the scope of the claims, without departing from the scope of my invention.

Example. I first make a solution of any hydrolyzed or partly hydrolyzed carbohydrate (say glucose) containing preferably approximately 12% to 15% of fermentable matter and containing small amounts of proteids and ash constitutents, as well known, and add to this solution sufficient lactic acid so that it will contain about 0.65% (or say between 0.30% and 0.80%) of lactic acid. I then add to this solution a pure culture of lactic bacteria, and warm up the solution to a temperature of about 112 to 114° F. I maintain this temperature throughout the fermentation. These bacteria multiply and produce lactic acid. At least as often as every eight hours, I add a sufficient amount of an alkali, preferably slaked lime (calcium hydroxide) or calcium carbonate to neutralize all of the acid present except about 0.65% (as shown by titrating a sample with, say lime water). I continue doing this until all the readily fermentable carbohydrate is converted into lactic acid or until the lactic bacteria discontinue producing more lactic acid. During this entire time, called fermentation, I preferably keep the solution at a temperature between 112° F., and 114° F. The process is herein particularly described, using calcium compounds for neutralization of the excess acidity, but alkalies and materials capable of neutralizing acidity, might be used in the same manner. During the fermentation and thereafter during the process of manufacture so long as there is any calcium lactate present in the liquor, I inject into the liquor (from time to time, or continuously) oxygen or pure air or other gases containing oxygen. These gases are used in amount sufficient to substantially prevent the formation of butyric acid. Thus to each 1000 gallons of the liquor while the liquor is at 112 to 114° F. I inject about 15 cubic feet of air per hour or an equivalent amount of oxygen. I have found that lactic acid or lactates will not be converted into butyrates or butyric acid if there is an excess of air or oxygen in the solution. This air or oxygen added to the solution during the fermentation also increases the activity of the lactic bacteria.

After the completion of the fermentation, I add lime to the solution (preferably as calcium oxide) in amount sufficient to give the solution a degree of alkalinity equal to at least 0.5%, and I then heat the solution to a temperature of approximately 212° F. (i. e. close to the boiling point) preferably maintaining it at this temperature for about eight hours. This converts any of the carbohydrates which may remain in the solution into caramel or a similar compound. I then filter this solution which removes certain of the impurities, some caramel, and most of the excess of the lime over that necessary to make the solution neutral. During this portion of the treatment, the proportion of air injected is preferably considerably increased, due to the fact that the heating of the liquor drives out the air which is dissolved therein. Hence during all those parts of the process where a temperature above 114° F. is used, I also preferably use more air than above indicated. The amount of aeration is subject to variation between wide limits.

At this point I preferably concentrate the solution until the same contains approximately 25 to 30% of calcium lactate, keeping it at all times at a temperature above 150° F., and continuing the aeration. It is not essential that the concentration be effected at this stage of the process, but I prefer to do so because, from experience, I have found it more economical and better to concentrate at this stage, rather than later on in the operation.

I then add to this solution enough pure lactic acid so that it will contain about 1% of free lactic acid, and to this solution I add sufficient lead lactate, or any other substance capable of precipitating the nitrogenous matter (proteids and their conversion products) present in the liquor. Other substances instead of lead lactate can be used for this operation but I have found the lead salt to be highly economical for the purpose. Keeping this solution at all times at a temperature of approximately 150° F., I add (very slowly) sufficient lime to give the solution an alkalinity of about 0.5% (or somewhat more). At different degrees of both acidity and alkalinity, various proteins are thrown out of solution and as I have found from experience that they combine with lead more readily when undergoing or having undergone this change I have found it preferable to add the alkali to the solution very slowly and continuously, e. g. by running in a slow stream of dilute milk of lime, or by sprinkling in dry lime, while stirring. I have found that the best results are obtained by taking at least two hours to make the solution alkaline to the degree stated. No harm results if the solution is made more alkaline but from experience I have found the best results are obtained if the solution is brought to this degree of alkalinity. This operation completes the precipitation of all nitrogenous matter. As the lead and nitrogenous matter are now in the form of insoluble compounds, I separate both lead and nitrogenous matter from the calcium lactate solution, preferably by passing the solution through a filter press.

I may heat the press cake containing both lead and nitrogenous matter, in a suitable container, to a temperature sufficient to volatilize the nitrogen as ammonia, etc. I collect these nitrogen compounds in any one of a number of ways so as to produce a commercial salable product (e. g. absorption in the sulphuric acid). I heat the lead residue, in air, to a temperature sufficient to convert it into oxide, which in turn I convert into lead lactate and use it again in my process as described above.

To the filtrate from the above filtration. I then add sufficient lactic acid to give to the solution an acidity of about 0.25 to 0.50%, and to this I then add sufficient activated vegetable carbon or other suitable material, to adsorb the remaining caramel and other coloring matter, and raise the temperature to about 190° F. The length of time this solution should remain with the carbon for the latter to adsorb the coloring matter will depend upon the carbon or other adsorbent used. I then, by filtration, separate the carbon and the coloring matter and such other impurities as it has adsorbed from the lactate solution.

This carbon can be then revivified by processes already known in the art, to be made suitable for again being used in the process.

If any heavy metals are still present in the solution, I then reduce the temperature to about 150° F., and add to this solution hydrogen sulphide or any other substance capable of precipitating these metals. This precipitate being insoluble I again pass the solution through a filter press and separate the insoluble substances from the calcium lactate solution.

I now have a colorless solution of calcium lactate, substantially free from all impurities, and during all the time since the end of the fermentation step, this liquor has been maintained at a temperature above 125° F., and during all this time including the period of fermentation the solution has contained an excess of air or oxygen. This solution is essentially free of butyric acid and butyrates.

If I wish to make calcium lactate I can simply evaporate the water out of this solution. If I wish to make lactic acid I can add to the solution of calcium lactate, preferably while at a temperature of approximately 150° F., sufficient sulphuric acid to combine with all the calcium present forming calcium sulphate and lactic acid. As calcium sulfate is practically insoluble I can easily separate it from the lactic acid by filtration. If I wish to remove any small amount of calcium sulphate still remaining in the solution I can separate it preferably by treating with compounds of barium (barium sulphate being insoluble) and with oxalic acid or an oxalate, (calcium oxalate being insoluble). If I wish to make calcium acid lactate, I add to the calcium lactate (which may or may not have been freed from water), lactic acid in amount sufficient to bring the free acid present up to any desired per cent. I allow this to crystallize and then evaporate the water from this solution; or I add to a solution of calcium lactate, at about 150° F., sufficient sulphuric acid to combine with enough of the calcium to leave calcium acid lactate having the desired degree of acidity, and then by filtration I separate the calcium sulphate from the solution. I then allow this solution to cool and crystallize and then remove the excess of water by slow evaporation. In drying calcium lactate or calcium acid lactate I have found it desirable not to have the temperature at which it is dried go much above 38° C. (100° F.).

At different points in the process where I have mentioned the addition of lactic acid to the solution to make the same slightly acid, I do not limit myself to the use of lactic acid as, under certain conditions I can use sulphuric acid instead of lactic acid.

The processes previously discovered all depend, for the separation of impurities, upon adding to the lactic acid, certain substances to combine or mix with the lactic acid, and thereby remove the lactic acid from the impurities. My process is exactly the reverse—I add substances to a solution of lactic acid or to a salt of lactic acid or both, to combine with the impurities, and thereby remove the impurities from the lactic acid or lactate.

It is to be understood that where lime is referred to for neutralizing acidity and making alkaline, other alkalies or equivalent materials can be used, as well known in the art.

I have above referred to the use of lead lactate for precipitating proteids and their conversion products, but other materials can be used, including other lead salts or tannin.

I claim:

1. In the process of making lactic acid by the fermentation of an acid liquor containing somewhat hydrolyzed carbohydrate material, in the presence of lactic acid bacteria, while preventing excessive accumulation of acid in said liquor, at a temperature of about 112 to 114° F., the steps of introducing a gaseous oxidizing material containing free oxygen, during the fermentation treatment, in amount sufficient to substantially retard the production of butyric acid, thereafter rendering the liquor alkaline and heating to near the boiling point of water, whereby remaining carbohydrates are converted into caramel-like products, thereafter adjusting the H-ion concentration in the solution and removing proteins and similar nitrogenous substances.

2. In the production of lactic acid and its compounds, the step of fermenting by lactic acid bacteria, in the presence of free oxygen introduced, a liquor containing hydrolyzed carbohydrates, whereby the formation of butyric acid is, to a large extent at least, inhibited.

3. In the formation of lactic acid by fermentation, the steps of first separating the major part at least of the proteid matter and of unfermented carbohydrate matter from the fermented liquor, prior to the recovery of materials containing the lactic acid radical therefrom.

4. In the production of lactic acid by fermentation, the step of maintaining in the solution, throughout the time that the solution contains compounds containing the lactic acid radical, an excess of free oxygen, whereby the formation of butyric acid and butyrates is substantially prevented.

5. In the treatment of fermentation liquors containing lactic acid, the steps of making the solution slightly alkaline and heating at least nearly up to the boiling point, separating insolubles, making slightly acid and adding a precipitant for nitrogenous compounds, slowly making the liquor alkaline while keeping it hot, separating insolubles, and decolorizing the solution.

6. In the precipitation of protein and analogous substances from solutions containing the same and containing lactate compounds, the steps of making the hot solution somewhat acid, adding a soluble lead compound, then making the solution alkaline while hot, and separating the insolubles.

7. In the precipitation of protein and analogous substances from fermentation liquors containing lactate compounds, the step of rendering the hot liquor somewhat acid, adding a soluble lead compound, and then, while keeping the liquor hot, very slowly adding alkali until the liquor is distinctly alkaline, and separating the insolubles.

8. In the treatment of lactate solutions containing carbohydrates, the step of heating the alkaline lactate solution to caramelize the bulk of the carbohydrates therein, and subsequently removing the color by adsorption with active carbon.

9. A process which comprises aerating an acid solution containing hydrolyzed carbohydrates in the presence of lactic acid bacteria, during the fermentation operation.

10. A process which comprises aerating an acid solution containing hydrolyzed carbohydrates in the presence of lactic acid bacteria, during the fermentation operation, thereafter removing from the solution impurities including nitrogen compounds, unfermented carbohydrates and coloring matters, thereby leaving a substantially pure solution of a compound containing the lactic acid radical.

11. A process which comprises aerating an acid solution containing hydrolyzed carbohydrates in the presence of lactic acid bacteria, during the fermentation operation, thereafter removing from the solution impurities including nitrogen compounds, unfermented carbohydrates and coloring matters, thereby leaving a substantially pure solution of a compound containing the lactic acid radical, and aerating as long as any compound containing the lactic acid radical is in the solution.

12. A process of making lactic acid which comprises fermenting a somewhat hydrolyzed carbohydrate material in the presence of lactic acid bacteria, aerating said liquor throughout said treatment to greatly retard the production of butyric acid, making the solution somewhat alkaline, heating to convert carbohydrates into a caramel-like material, thereafter acidifying and adding a lead compound to precipitate proteids.

In testimony whereof I affix my signature.

STANLEY E. FAITHFULL.